United States Patent
Bartscherer et al.

(10) Patent No.: US 9,610,611 B2
(45) Date of Patent: Apr. 4, 2017

(54) METHOD OF LINING AN INNER SURFACE OF A TUBULAR AND SYSTEM FOR DOING SAME

(71) Applicants: Erik Bartscherer, Saarbrücken (DE);
Sven Delden, Lachendorf (DE);
Helmut G. Benning, Hannover (DE)

(72) Inventors: Erik Bartscherer, Saarbrücken (DE);
Sven Delden, Lachendorf (DE);
Helmut G. Benning, Hannover (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 186 days.

(21) Appl. No.: 14/178,844

(22) Filed: Feb. 12, 2014

(65) Prior Publication Data
US 2015/0226364 A1    Aug. 13, 2015

(51) Int. Cl.
| | | |
|---|---|---|
| B05D 7/22 | (2006.01) | |
| B05C 7/08 | (2006.01) | |
| B05C 7/02 | (2006.01) | |
| B05D 7/00 | (2006.01) | |
| F16L 58/10 | (2006.01) | |
| F04C 2/107 | (2006.01) | |

(52) U.S. Cl.
CPC ............ B05D 7/222 (2013.01); B05C 7/02 (2013.01); B05C 7/08 (2013.01); B05D 7/52 (2013.01); F16L 58/1045 (2013.01); B05D 2202/00 (2013.01); F04C 2/1075 (2013.01); F04C 2230/91 (2013.01)

(58) Field of Classification Search
None
See application file for complete search history.

(56) References Cited

U.S. PATENT DOCUMENTS

| | | |
|---|---|---|
| 3,699,197 A | 10/1972 | Egger |
| 4,991,292 A | 2/1991 | Bostel |
| 5,318,416 A | 6/1994 | Hantschk et al. |
| 5,913,977 A * | 6/1999 | Nichols ............... F16L 55/46 118/254 |
| 6,158,988 A | 12/2000 | Jager |
| 6,543,132 B1 | 4/2003 | Krueger et al. |
| 7,192,260 B2 | 3/2007 | Lievestro et al. |

(Continued)

FOREIGN PATENT DOCUMENTS

| | | |
|---|---|---|
| AT | 500932 B2 | 5/2006 |
| CN | 2910533 Y | 6/2007 |

(Continued)

OTHER PUBLICATIONS

Notification of Transmittal of the International Search Report of the International Searching Authority, or the Declaration; PCT/US2015/014791; Mailed May 26, 2015; 5 Pages.

(Continued)

*Primary Examiner* — William Phillip Fletcher, III
(74) *Attorney, Agent, or Firm* — Cantor Colburn LLP

(57) ABSTRACT

A method of lining an inner surface of a tubular with a polymer, includes positioning a polymer injecting head within the tubular, forming an annular space between the injecting head and an inner surface of the tubular, injecting polymer through the injecting head into the annular space, and moving the polymer injecting head longitudinally relative to the tubular while injecting polymer.

11 Claims, 2 Drawing Sheets

(56) References Cited

U.S. PATENT DOCUMENTS

| | | | |
|---|---|---|---|
| 7,739,792 | B2 | 6/2010 | Lee et al. |
| 7,867,558 | B1 * | 1/2011 | Weisenberg ........ B05B 13/0636 427/236 |
| 7,951,755 | B2 * | 5/2011 | Wu .......................... C09K 8/28 175/65 |
| 2004/0131716 | A1 | 7/2004 | Neubauer |
| 2005/0285305 | A1 | 12/2005 | Neuroth |
| 2008/0000083 | A1 | 1/2008 | Wood et al. |
| 2008/0251963 | A1 | 10/2008 | Steiner |
| 2009/0110658 | A1 * | 4/2009 | Sakamoto ............... C08L 83/04 424/78.09 |
| 2009/0304843 | A1 | 12/2009 | Steiner et al. |
| 2010/0086425 | A1 | 4/2010 | Steele et al. |
| 2010/0221500 | A1 | 9/2010 | Steiner et al. |
| 2010/0284843 | A1 | 11/2010 | Jager et al. |
| 2011/0271527 | A1 | 11/2011 | Lee et al. |
| 2012/0148432 | A1 | 6/2012 | Butuc et al. |
| 2013/0056443 | A1 | 3/2013 | Ramier et al. |
| 2013/0251572 | A1 | 9/2013 | Butuc et al. |

FOREIGN PATENT DOCUMENTS

| | | |
|---|---|---|
| DE | 102008005669 A1 | 7/2009 |
| JP | 59115765 A | 7/1984 |
| JP | 08080566 A | 3/1996 |
| JP | 11047663 A | 2/1999 |
| WO | 2013126546 A1 | 8/2013 |
| WO | 2014007090 A1 | 1/2014 |

OTHER PUBLICATIONS

Suppliers Showcase; Rubber World, Feb. 2013 (Feb. 2013) [retrieved on Oct. 15, 2013 (Oct. 15, 2013)]. Retrieved from the internet:, http://digitaleditions.walsworthprintgroup.com/display_article.php?id=1325159#.

Written Opinion of the International Searching Authority; PCT/US2015/014791; Mailed May 26, 2015; 6 Pages.

* cited by examiner

METHOD OF LINING AN INNER SURFACE OF A TUBULAR AND SYSTEM FOR DOING SAME

BACKGROUND

Typically applying a polymeric layer to the inner surface of a tubular, such as a stator for a mud motor for example, involves attaching a mold within the tubular thereby defining a cavity between the mold and a surface of the tubular. The polymer is injected through the mold and into the cavity. For tubulars that are long and have small inner radial dimensions it can be difficult to inject the polymer to fully fill the cavity. In applications wherein the polymer is viscous while injecting the difficulty of filling the cavity is exacerbated. As such, those that practice in the art of applying such layers are always receptive to systems and methods that alleviate the foregoing difficulties.

BRIEF DESCRIPTION

Disclosed herein is a method of lining an inner surface of a tubular with a polymer. The method includes, positioning a polymer injecting head within the tubular, forming an annular space between the injecting head and an inner surface of the tubular, injecting polymer through the injecting head into the annular space, and moving the polymer injecting head longitudinally relative to the tubular while injecting polymer.

Also disclosed is a system for lining an inner surface of a tubular. The system includes, an injecting head having at least one nozzle configured to inject a polymer therethrough into an annular space defined between the injecting head and an inner surface of the tubular. The system is configured to move the injecting head relative to the tubular while the injecting head is injecting polymer through the at least one nozzle to leave a layer of the polymer a full 360 degrees against the inner surface of the tubular.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
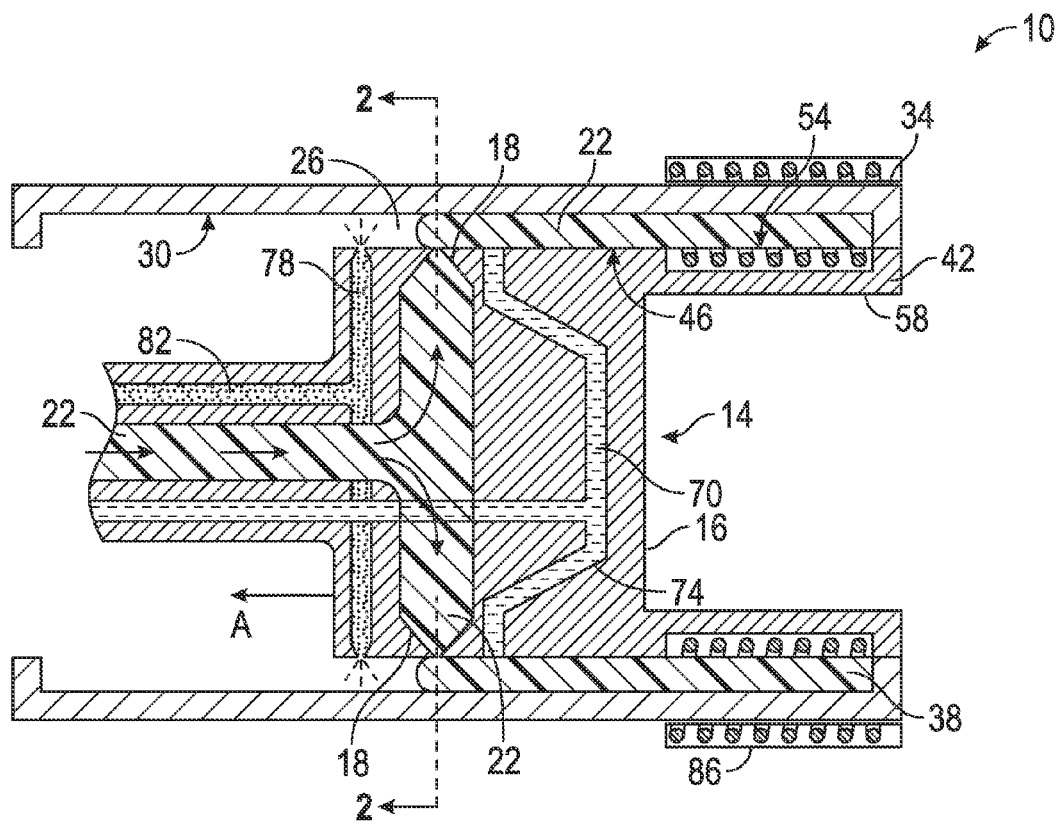
FIG. 1 depicts a cross sectional view of a system for lining an inner surface of a tubular.
Figure 2:
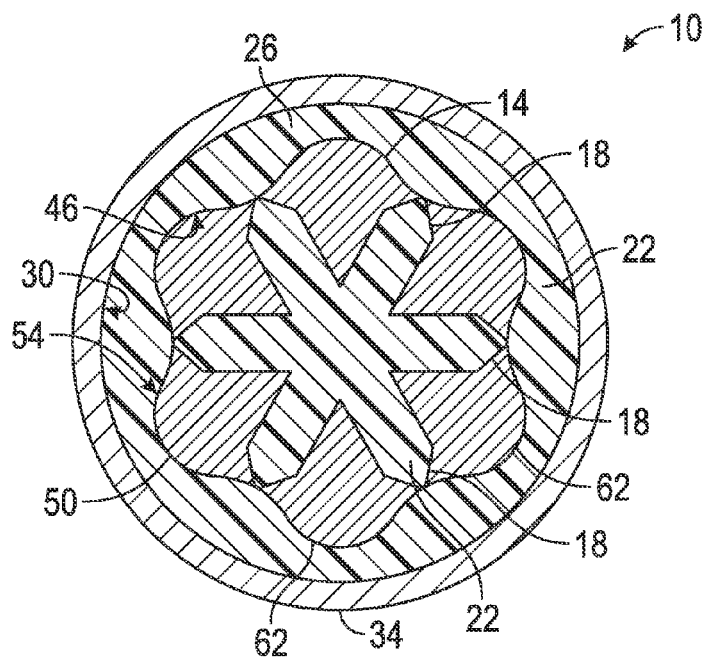
FIG. 2 depicts a cross sectional view of the system of FIG. 1 taken at arrows 2-2.

Referring to FIGS. 1 and 2, an embodiment of a system for lining an inner surface of a tubular is illustrated at 10. The system 10 includes, an injecting head 14 having body 16 with at least one nozzle 18 with six of the nozzles 18 being illustrated in this embodiment. The system 10 is configured to inject polymer 22 through the injecting head 14 and through the nozzles 18 into an annular space 26 defined between the injecting head 14 and an inner surface 30 of a tubular 34 that is being lined. The injecting head 14 is longitudinally movable in the direction of arrow A (in FIG. 1) relative to the tubular 34 while the polymer 22 is being injected. A portion 38 of the polymer 22 is able to at least partially set or partially solidify before a tail 42 of the injecting head 14 is moved away from the portion 38. As such, an inner surface 46 of the polymer 22 is contoured to have a profile 50 defined by an outer surface 54 of the injecting head 14.

In the illustrated embodiment the system includes a temperature altering head 58 that is integrated into the tail 42 of the injecting head 14. The temperature altering head 58 can include a heater or a cooler to alter the temperature of the head 58. One use of the temperature altering head 58 is to vulcanize or cure the polymer 22. A good candidate for usage as the polymer in such instance would be a rubber. The system 10 in this embodiment is configured so that the vulcanization of the polymer 22 is completed by the heating of the heads 14 and 58 so that no additional heating is required after the heads 14, 58 have been withdrawn from the tubular 34. In so doing the vulcanizing is done sequentially as the heads 14, 58 are moved longitudinally relative to the polymer 22. Additionally, the tail 42 can be tapered so that it has larger radial dimensions at points further from the nozzles 18. This can allow the tail 42 to exert increases in pressure to the polymer 22 during the vulcanizing process.

Figure 3:
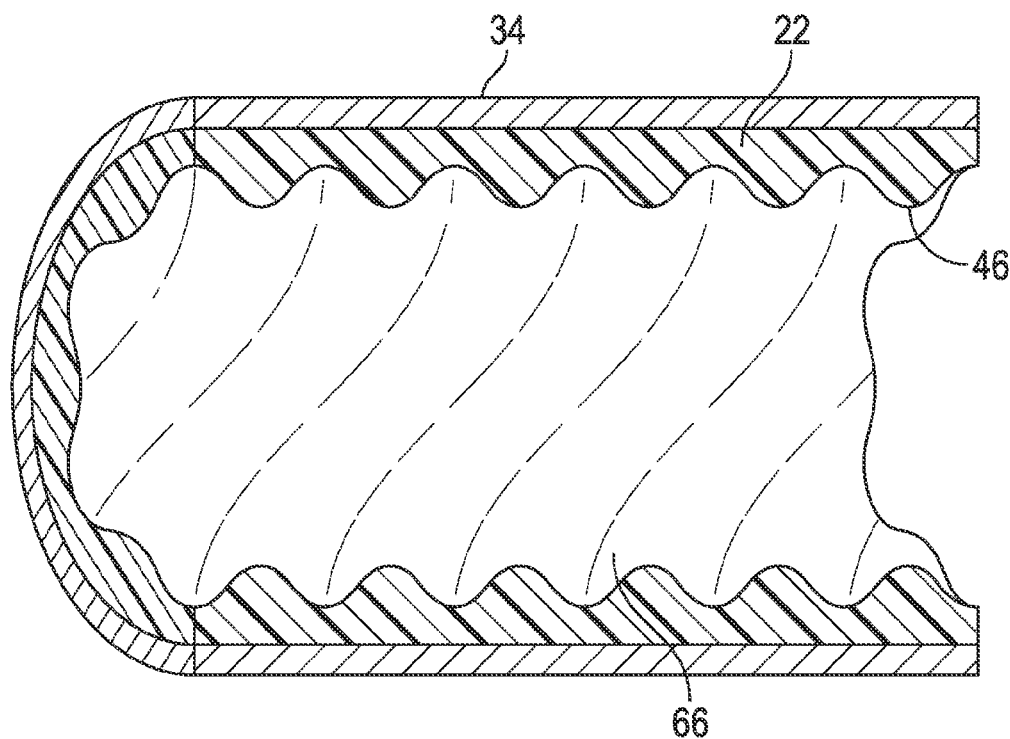
FIG. 3 depicts a partial cross sectional perspective view of a polymer and tubular assembly created with the system of FIG. 1.

In addition to longitudinally moving the injecting head 14 relative to the tubular 34 while the polymer 22 is being injected, the injecting head 14 may be rotated. In embodiments wherein the outer surface 54 of the injecting head 14 is none circular, such as one having lobes 62 as shown in FIG. 2, the combination of longitudinal and rotational movement of the injecting head 14 will cause the profile 50 in the inner surface 46 of the polymer 22 to have one or more helical channels 66. This helical channeled profile 50 is best seen in the partial cross sectional perspective view of FIG. 3 that shows a cured portion of the polymer 22 within the tubular 34. The assembly formed by the polymer 22 and the tubular 34 can be a stator for a mud motor, for example, as are used in downhole industries such as the hydrocarbon recovery and the carbon dioxide sequestration industries. In a mud motor application the tubular 34 and the polymer 22 with the helical channel 66 formed therein can serve as a stator assembly. Stator assemblies are often very long compared to their radial dimensions. Employing the system 10 disclosed herein allows an operator to consistently and repeatedly apply the polymer 22 to very long tubulars 34, unlike processes that require assembling a mold core within the tubular 34 and trying to inject viscous polymer to fill the cavity defined between the core and a long tubular. Such processes suffer from mold fill problems related to the shot size, the long distance runs the polymer must travel through the core before reaching the cavity, and the slow flow rates associated with high viscosity of the polymers being injected.

The system 10 can also include optional features to improve its function further. For example, a lubricant 70 such a mold release agent can be applied between the polymer 22 and the injecting head 14 through porting 74 in the injecting head 14. Injecting the lubricant 70 can decrease friction associated with moving the injecting head 14 relative to the stationary polymer 22. Any practical number of outlets from the porting 74 can be provided to facilitate injection of the lubricant 70 a full 360 degrees around the injecting head 14 similar to the manner in which the nozzles 18 inject the polymer 22 a full 360 degrees around the injecting head 14.

Similarly, a plurality of passageways 78 can optionally be incorporated in the injecting head 14 to apply adhesive 82 to the inner surface 30 of the tubular 34 just prior to the polymer 22 being injected thereagainst. The adhesive 82 can be used to improve bonding between the polymer 22 and the tubular 34.

An additional optional temperature altering member 86 is also shown in FIG. 1. The temperature altering member 86 is positionable outside of the tubular 34 and is configured to alter the temperature of the polymer 22 in a manner similar to that of temperature altering head 58. As such the member 86 can work in unison with the head 58 or separately. Regardless of whether the member 86 acts alone or with the head 58, configuring it to move relative to the tubular 34 and thus the polymer 22 allows it to be smaller than the full length of the polymer 22 while being able to alter the temperature of the complete polymer 22 when altering properties of the polymer 22 such as through vulcanization, for example.

Unlike conventional systems wherein a mold must be sized to fit each tubular to be coated, a single one of the systems 10 disclosed herein can be used to coat tubulars 34 of various lengths. Additionally, this size matching requirement of molds of conventional systems means the overall size (length primarily) of the tool is greater, possibly much greater than the size of the system 10 disclosed herein that can coat the same tubulars. The smaller size and use of just one of the systems 10 for various sized tubulars can result in significant savings in cost of fabrication, materials, manpower and inventory over conventional systems.

Figure 4:
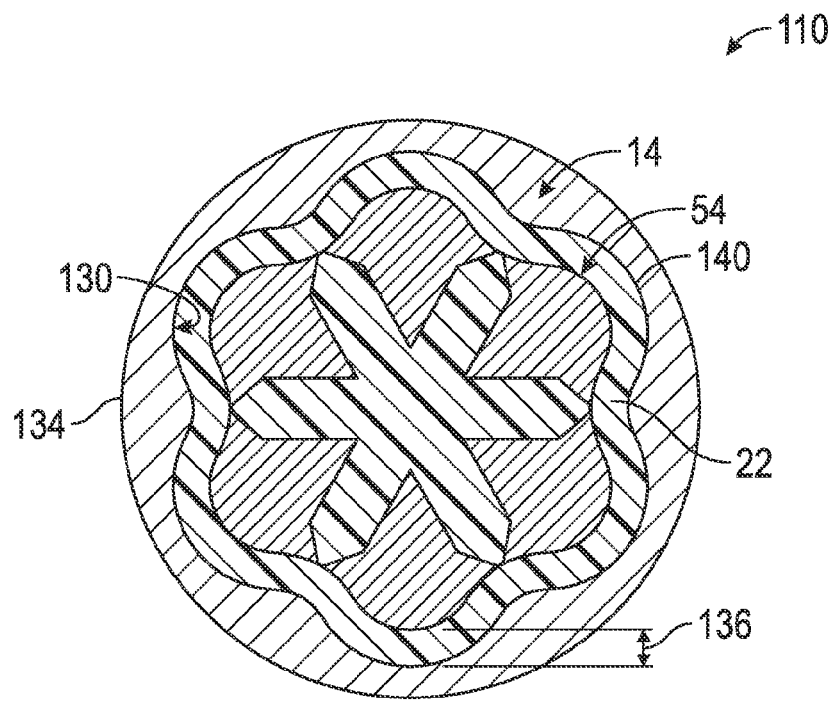
FIG. 4 depicts a cross sectional view of an alternate embodiment of a system for lining an inner surface of a tubular disclosed herein.

Referring to FIG. 4, an alternate embodiment of a system for lining an inner surface of a tubular is illustrated at 110. The system 110 differs from the system 10 primarily in that the shape of an inner surface 130 of tubular 134 has a helical contour with channels 140 (similar in fashion to the inner surface 46), in contrast to the inner surface 30 of the tubular 34 of system 10 that is cylindrical. Since the contoured outer surface 54 of the injecting head 14 is complementary to the inner surface 130 a radial dimension 136 of the polymer 22 remains substantially constant. The system 110 requires coordination of movement of the injecting head 14 in both the longitudinal and rotational directions while injecting the polymer 22 to assure that the lobes 62 remain properly aligned with the channels 140 as the polymer 22 is injected against the inner surface 130.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of lining an inner surface of a tubular with a polymer, comprising:
    positioning a polymer injecting head within the tubular;
    forming an annular space between the injecting head and an inner surface of the tubular;
    injecting polymer through the injecting head into the annular space;
    moving the polymer injecting head longitudinally relative to the tubular while injecting polymer; and
    forming a helical shaped channel on an inner surface of the polymer.

2. The method of lining an inner surface of a tubular with a polymer of claim 1, further comprising vulcanizing the polymer.

3. The method of lining an inner surface of a tubular with a polymer of claim 2, further comprising vulcanizing the polymer sequentially from one end of the tubular to the other.

4. The method of lining an inner surface of a tubular with a polymer of claim 1, further comprising moving a temperature altering head with the polymer injecting head and altering temperature of the injected polymer with the temperature altering head.

5. The method of lining an inner surface of a tubular with a polymer of claim 1, further comprising rotating the polymer injecting head relative to the tubular while it is moving longitudinally.

6. The method of lining an inner surface of a tubular with a polymer of claim 1, further comprising maintaining a substantially constant radial dimension of the polymer.

7. The method of lining an inner surface of a tubular with a polymer of claim 1, further comprising injecting the polymer to continuously cover 360 degrees of the inner surface of the tubular.

8. The method of lining an inner surface of a tubular with a polymer of claim 1, further comprising bonding the polymer to the inner surface of the tubular.

9. A method of lining an inner surface of a tubular with a polymer, comprising:
    positioning a polymer injecting head within the tubular;
    forming an annular space between the injecting head and an inner surface of the tubular;
    injecting polymer through the injecting head into the annular space; and
    moving the polymer injecting head longitudinally relative to the tubular while injecting polymer further comprising injecting adhesive between the polymer and the tubular.

10. A method of lining an inner surface of a tubular with a polymer comprising:
    positioning a polymer injecting head within the tubular;
    forming an annular space between the injecting head and an inner surface of the tubular;
    injecting polymer through the injecting head into the annular space; and
    moving the polymer injecting head longitudinally relative to the tubular while injecting polymer further comprising injecting a lubricant between the polymer and the polymer injecting head.

11. A method of lining an inner surface of a tubular with a polymer comprising:

positioning a polymer injecting head within the tubular;
forming an annular space between the injecting head and an inner surface of the tubular;
injecting polymer through the injecting head into the annular space; and
moving the polymer injecting head longitudinally relative to the tubular while injecting polymer further comprising solidifying portions of the polymer before the polymer injecting head is moved out of contact with the solidified portions of the polymer.

* * * * *